(12) United States Patent
Choi

(10) Patent No.: US 10,606,836 B2
(45) Date of Patent: Mar. 31, 2020

(54) APPARATUS FOR MANAGING LOCAL MONITORING DATA

(71) Applicant: LSIS CO., LTD., Anyang-si, Gyeonggi-do (KR)

(72) Inventor: Hwa-Young Choi, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 167 days.

(21) Appl. No.: 15/388,703

(22) Filed: Dec. 22, 2016

(65) Prior Publication Data

US 2017/0322975 A1    Nov. 9, 2017

(30) Foreign Application Priority Data

May 9, 2016 (KR) .................. 10-2016-0056648

(51) Int. Cl.
  *G06F 7/00* (2006.01)
  *G06F 16/2455* (2019.01)
  (Continued)

(52) U.S. Cl.
  CPC .......... *G06F 16/2455* (2019.01); *G06F 16/22* (2019.01); *G06Q 10/06* (2013.01);
  (Continued)

(58) Field of Classification Search
  CPC ......... G06F 17/30477; G06F 17/30312; G06F 16/2455; G06F 16/2422; H02S 50/00; G06Q 50/06; G06Q 10/06
  (Continued)

(56) References Cited

U.S. PATENT DOCUMENTS 8,156,101 B2    4/2012  Indeck et al.
8,914,414 B2   12/2014  Jacobson et al.
          (Continued)

FOREIGN PATENT DOCUMENTS

JP    2013-9588 A    1/2013
JP    2014-54048 A   3/2014
          (Continued)

OTHER PUBLICATIONS

European Search Report dated Feb. 21, 2017 in corresponding counterpart European Patent Application No. 16201176.1.
(Continued)

*Primary Examiner* — Md I Uddin
(74) *Attorney, Agent, or Firm* — K&L Gates LLP

(57) ABSTRACT

The present disclosure relates to an apparatus for managing local monitoring data. The apparatus for managing local monitoring data includes an identification unit configured to identify monitoring data as one of structured monitoring data and unstructured monitoring data using flag information of the monitoring data, a storage unit configured to store structured monitoring data in a relational database or unstructured monitoring data in an unstructured database on the basis of an identification result of the monitoring data, and a conversion unit configured to search structured monitoring data corresponding to a data conversion condition among the structured monitoring data to convert the searched structured monitoring data into unstructured monitoring data.

3 Claims, 3 Drawing Sheets

(51) Int. Cl.
*G06F 16/22* (2019.01)
*G06Q 50/06* (2012.01)
*G06Q 10/06* (2012.01)
*H02S 50/00* (2014.01)

(52) U.S. Cl.
CPC ............ *G06Q 50/06* (2013.01); *H02S 50/00* (2013.01); *Y04S 10/60* (2013.01)

(58) Field of Classification Search
USPC .................................. 707/610, 634, 769, 726
See application file for complete search history.

(56) References Cited

U.S. PATENT DOCUMENTS

| | | |
|---|---|---|
| 9,286,646 B1 | 3/2016 | Hoff |
| 2010/0106752 A1 | 4/2010 | Eckardt, III et al. |
| 2011/0225185 A1 | 9/2011 | Gupta |
| 2011/0227754 A1 | 9/2011 | Hill |
| 2012/0242320 A1 | 9/2012 | Fischer et al. |
| 2012/0271576 A1 | 10/2012 | Kamel et al. |
| 2012/0317078 A1* | 12/2012 | Zhou ................. G06F 17/30575 707/634 |
| 2015/0261837 A1 | 9/2015 | Avasthi |
| 2015/0310090 A1 | 10/2015 | Doshi |
| 2016/0207643 A1* | 7/2016 | Kimura .................... B64G 3/00 |
| 2016/0218511 A1* | 7/2016 | Li ............................ H02J 3/32 |
| 2016/0253679 A1* | 9/2016 | Venkatraman ..... G06Q 30/0185 705/310 |
| 2017/0308628 A1* | 10/2017 | Son ..................... G06F 17/5009 |

FOREIGN PATENT DOCUMENTS

| | | |
|---|---|---|
| JP | 2014-67205 A | 4/2014 |
| KR | 10-2009-0003093 A | 1/2009 |
| KR | 10-1226162 B1 | 1/2013 |
| KR | 10-2014-0116245 A | 10/2014 |
| KR | 10-1525529 B1 | 6/2015 |
| KR | 10-2015-0076472 A | 7/2015 |
| KR | 10-2015-0122855 A | 11/2015 |
| WO | 2007/041693 A2 | 4/2007 |

OTHER PUBLICATIONS

Kim, Jeong-Suk, " Big Data Utilization and Analysis of Related Technology", The Korea Contents Association 10th, vol. 1, Mar. 2012, pp. 34-35.
Copending Japanese Office Action dated Aug. 1, 2017.
Korean Office Action dated Jun. 5, 2017 in corresponding Korean Patent Application No. 10-2016-0056648.
European Office Action for related European Application No. 16201176.1; action dated Dec. 20, 2019; (8 pages).
Hu Han, et al; "Toward Scalable Systems for Big Data Analytics: A Technology Tutorial"; IEEE Access, vol. 2; Jul. 10, 2014; (36 pages).

* cited by examiner

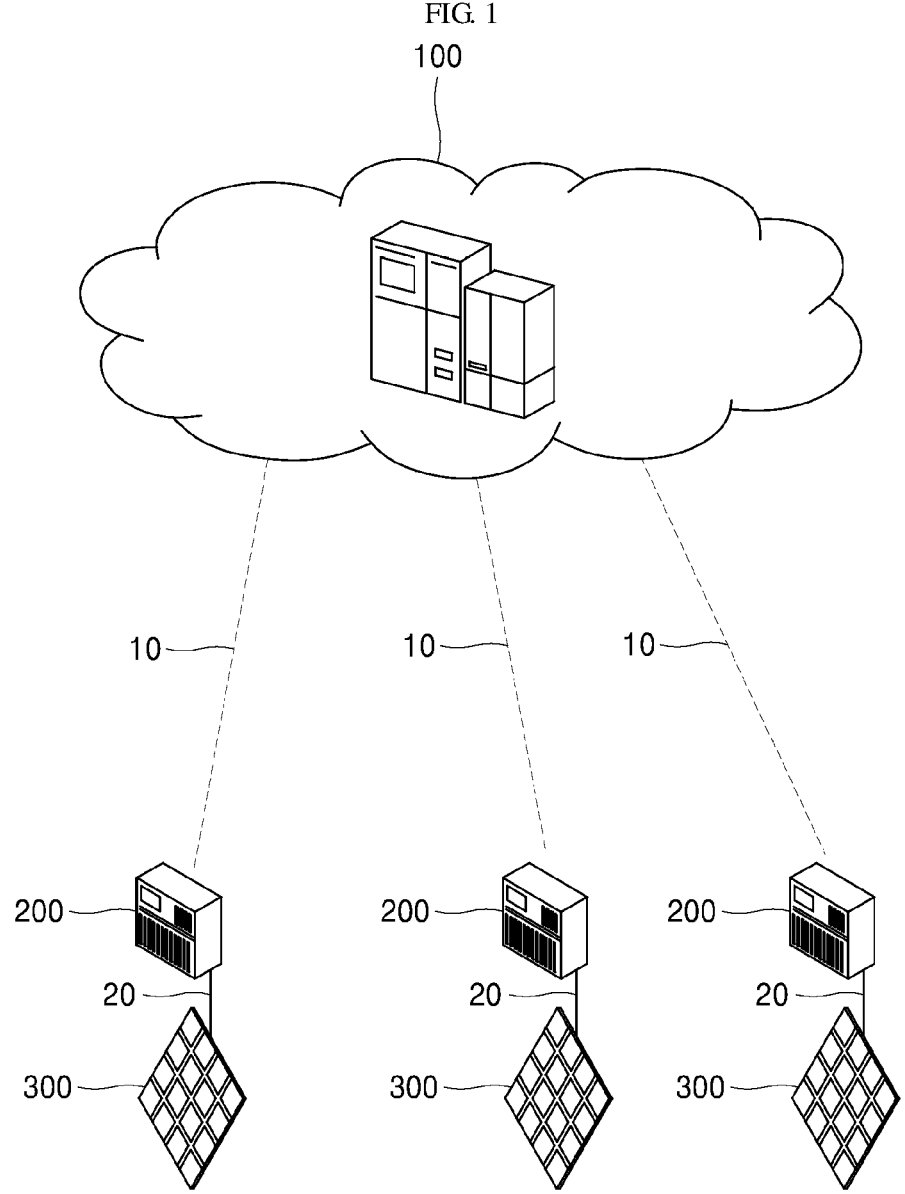

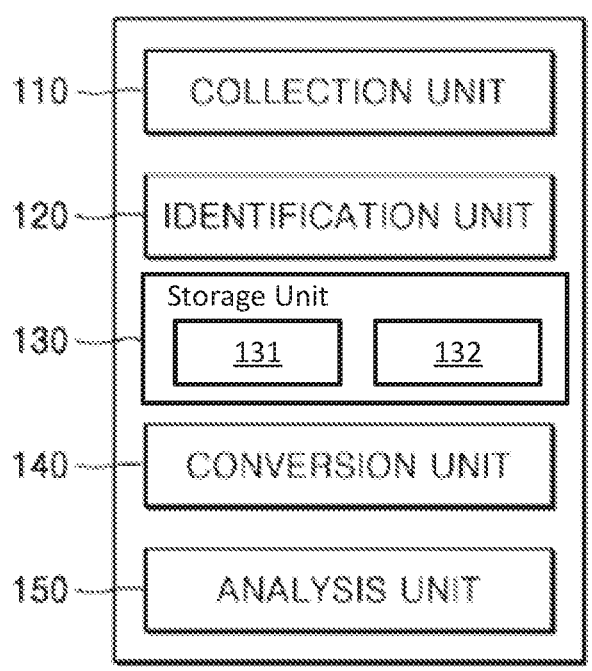

FIG. 3

| ELECTRIC POWER GENERATION INFORMATION [MILLIONkWh] | FIELD VALUES | | |
|---|---|---|---|
| | REGIONAL INFORMATION | MONITORING DATE INFORMATION | MONITORING TIME INFORMATION |
| 100 | SEOUL | JUNE 2014 | 9 O'CLOCK |
| 103 | SEOUL | JULY 2014 | 13 O'CLOCK |
| 128 | SEOUL | AUGUST 2014 | 12 O'CLOCK |
| 110 | SEOUL | SEPTEMBER 2014 | 23 O'CLOCK |
| 97 | SEOUL | OCTOBER 2014 | 3 O'CLOCK |
| 107 | SEOUL | NOVEMBER 2014 | 6 O'CLOCK |
| 111 | SEOUL | DECEMBER 2014 | 11 O'CLOCK |
| 120 | SEOUL | JANUARY 2015 | 10 O'CLOCK |
| 119 | SEOUL | FEBRUARY 2015 | 22 O'CLOCK |
| 102 | SEOUL | MARCH 2015 | 9 O'CLOCK |
| 108 | SEOUL | APRIL 2015 | 13 O'CLOCK |
| 100 | SEOUL | MAY 2015 | 12 O'CLOCK |
| 103 | SEOUL | JUNE 2015 | 23 O'CLOCK |
| 109 | SEOUL | JULY 2015 | 3 O'CLOCK |
| 125 | SEOUL | AUGUST 2015 | 6 O'CLOCK |
| 105 | GYEONGGI | SEPTEMBER 2015 | 11 O'CLOCK |
| 92 | GANGWON | OCTOBER 2015 | 10 O'CLOCK |
| 102 | GYEONGGI | NOVEMBER 2015 | 22 O'CLOCK |
| 106 | BUSAN | DECEMBER 2015 | 11 O'CLOCK |
| 126 | DAEGU | JANUARY 2016 | 10 O'CLOCK |
| 125 | DAEJEON | FEBRUARY 2016 | 22 O'CLOCK |
| 108 | GWANGJU | MARCH 2016 | 9 O'CLOCK |
| 114 | GWANGJU | APRIL 2016 | 13 O'CLOCK |
| 106 | DAEGU | MAY 2016 | 12 O'CLOCK |
| 109 | BUSAN | JUNE 2016 | 23 O'CLOCK |

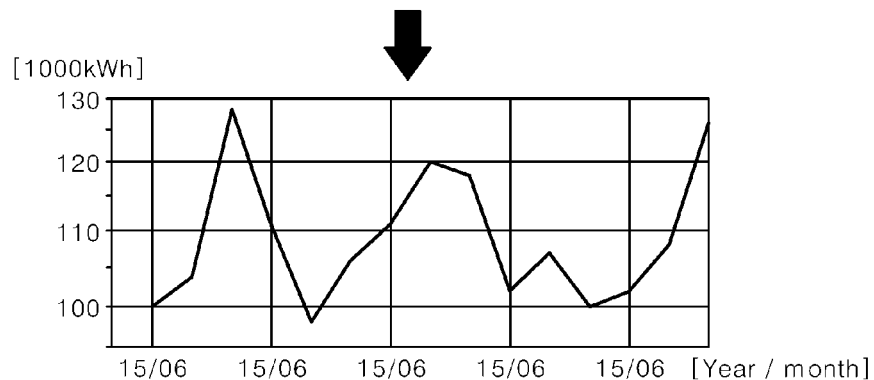

APPARATUS FOR MANAGING LOCAL MONITORING DATA

CROSS REFERENCE TO RELATED APPLICATION

This application claims the benefit of Korean Patent Application No. 10-2016-0056648, filed on May 9, 2016, entitled "APPARATUS FOR MANAGING LOCAL MONITORING DATA", which is hereby incorporated by reference in its entirety into this application.

BACKGROUND

1. Technical Field

The present disclosure relates to an apparatus for managing local monitoring data, and more particularly, to an apparatus for managing local monitoring data, which identifies monitoring data of a photovoltaic power generation system as structured monitoring data or unstructured monitoring data to store the structured monitoring data and the unstructured monitoring data in a relational database and an unstructured database, respectively, and selects structured monitoring data corresponding to a data conversion condition among the structured monitoring data, and converts the selected structured monitoring data into unstructured monitoring data.

2. Description of the Related Art

A photovoltaic power generation system is an electric power generation system which directly converts solar energy into electric energy using a photovoltaic effect. A photovoltaic power generation has advantages in which fuel does not need, there are no thermal pollution, environmental pollution, noise, radioactivity, and danger of explosion, the operation and maintenance are convenient, and unmanned task is easily done. On the other hand, the photovoltaic power generation has disadvantages in which an electric power generation cost is high to be uneconomical, an electric power generation amount is not uniform according to weather condition, and an electric power generation time is restricted due to limited sunshine hours (that is, night, day, and rainy).

Within a short distance of such a photovoltaic power generation system, a local monitoring apparatus is located and connected thereto. The local monitoring apparatus includes a temperature and humidity sensor unit for measuring environmental data such as temperature, an amount of solar radiation, and the like of a place at which a photovoltaic power generation facility will be installed, and an electric power sensor unit for measuring a result of an operational characteristic of a photovoltaic power generation system.

With such a configuration, the electric power sensor unit measures a voltage and a current of an inverter that converts electric power generated by a photovoltaic power generation array from a direct current (DC) into an alternating current (AC), and the local monitoring apparatus performs a failure diagnosis such as an electric power loss and the like on the basis of the measured voltage and current.

Meanwhile, a photovoltaic power generation cloud system communicates with a plurality of local monitoring apparatuses to receive the above described monitoring data. Also, the photovoltaic power generation cloud system analyzes and performs an arithmetic operation on the received monitoring data to produce electric power generation data per hour, season, month, and year.

Further, the photovoltaic power generation cloud system analyzes efficiency of the inverter of the photovoltaic power generation system and calculates an estimated electric power generation and an estimated price using the analyzed data.

At this point, when performing a data analysis for a simple monitoring service, the photovoltaic power generation cloud system performs the data analysis using structured monitoring data stored in a relational database.

Recently, to perform a big data analysis, a photovoltaic power generation cloud system performs a data analysis using unstructured monitoring data stored in an unstructured database.

Therefore, there is a problem in that a conventional photovoltaic power generation cloud system manages a relational database and an unstructured database so as to perform a data analysis for a simple monitoring service and a big data analysis.

Also, there is a problem in that the conventional photovoltaic power generation cloud system does not perform the big data analysis using the stored structured monitoring data because a conversion between structured monitoring data and unstructured monitoring data which are stored in different database, respectively, is not easy.

SUMMARY

An object of the present disclosure is directed to select structured monitoring data corresponding to a data conversion condition among structured monitoring data to perform an unstructured monitoring data conversion, thereby using the structured monitoring data in performing a big data analysis on monitoring data with respect to a photovoltaic power generation system.

Also, another object of the present disclosure is directed to search structured monitoring data corresponding to a preset data format, verify apparatus identification information combined with the structured monitoring data, and convert structured monitoring information, which is combined with apparatus identification information the same as the verified apparatus identification information, into unstructured monitoring data, thereby converting only the structured monitoring information collected from the same apparatus into unstructured monitoring information.

The objects of the present disclosure are not limited to the above described object, and other objects and advantages not mentioned above will be understood in the art from the following description and also will be apparently understood by an embodiment of the present disclosure. Also, it will be easily understood that the object and advantages of the present disclosure described herein may be implemented by means and a combination thereof defined by the appended claims.

To attain the described above objects, an apparatus for managing local monitoring data includes an identification unit configured to identify monitoring data as one of structured monitoring data and unstructured monitoring data using flag information of the monitoring data, a storage unit configured to store structured monitoring data in a relational database or unstructured monitoring data in an unstructured database on the basis of an identification result of the monitoring data, and a conversion unit configured to search structured monitoring data corresponding to a data conversion condition among the structured monitoring data to convert the searched structured monitoring data into unstructured monitoring data.

As described above, in accordance with the present disclosure, there is an effect in which structured monitoring data corresponding to a data conversion condition among structured monitoring data is converted into unstructured monitoring data so that a big data analysis may be performed using structured monitoring data that has been collected and stored in a relational database.

BRIEF DESCRIPTION OF DRAWINGS

FIG. 1 is a diagram illustrating a connection configuration between a local monitoring data management apparatus according to one embodiment of the present disclosure and a local monitoring apparatus.

FIG. 2 is a diagram illustrating a configuration of the local monitoring data management apparatus according to one embodiment of the present disclosure.

FIG. 3 is a diagram illustrating one example of structured monitoring data and unstructured monitoring data of the local monitoring data management apparatus according to one embodiment of the present disclosure.

DETAILED DESCRIPTION

The above and other objects, features and advantages of the present disclosure will be described later in detail with reference to the accompanying drawings, and thus the technical spirit of the present disclosure can be easily implemented by those skilled in the art. In the following description of the present disclosure, if a detailed description of known configurations and functions is determined to obscure the interpretation of embodiments of the present disclosure, the detailed description thereof will be omitted. Hereinafter, preferred embodiments according to the present disclosure will be described in detail with reference to the accompanying drawings. In the drawings, the same reference numerals refer to the same or similar elements throughout.

FIG. 1 is a diagram illustrating a connection configuration between a local monitoring data management apparatus 100 according to one embodiment of the present disclosure and a local monitoring apparatus 200.

Referring to FIG. 1, the local monitoring data management apparatus 100 according to one embodiment of the present disclosure communicates with the local monitoring apparatus 200 using a first communication network 10 to transmit and receive data. The local monitoring apparatus 200 may receive monitoring data with respect to electric power generation information of a photovoltaic power generation system 300 using a second communication network 20.

Here, the first communication network 10 may be a wireless communication network, and, for example, may be a communication network using one or more among an Ethernet communication, a wireless fidelity (Wi-Fi) communication, a code division multiple access (CDMA) communication, and a long term evolution (LTE) communication, and also it may be provided with a separate wireless access point (AP) when using the Wi-Fi communication.

Here, the second communication network 20 may be a wire communication network, and, for example, may be a communication network using one or more of a control area network (CAN) communication and a serial communication.

That is, the local monitoring data management apparatus 100 may be connected to the local monitoring apparatus 200 through the first communication network 10, which is a wireless communication network, to collect monitoring data at a remote site.

On the other hand, the local monitoring apparatus 200 may be located at a short distance with respect to the photovoltaic power generation system 300 to receive data through the second communication network 20 that is a wire communication network.

FIG. 2 is a diagram illustrating a configuration of the local monitoring data management apparatus 100 according to one embodiment of the present disclosure.

Referring to FIG. 2, the local monitoring data management apparatus 100 according to one embodiment of the present disclosure includes a collection unit 110, an identification unit 120, a storage unit 130, a conversion unit 140, and an analysis unit 150.

The collection unit 110 may collect monitoring data with respect to electric power generation information of the photovoltaic power generation system 300, which is produced from the local monitoring apparatus 200.

At this point, as described above, the collection unit 110 may collect the monitoring data by receiving the monitoring data from the local monitoring apparatus 200 using the first communication network 10 that is a wireless communication network.

For this purpose, the collection unit 110 may include one or more among an Ethernet communication module, a Wi-Fi communication module, a CDMA communication module, and an LTE communication module.

Meanwhile, the collection unit 110 may collect the monitoring data by combining apparatus identification information of the local monitoring apparatus 200 with the monitoring data.

More particularly, the collection unit 110 may receive the monitoring data together with the apparatus identification information of the local monitoring apparatus 200 therefrom and combine the received monitoring data with the apparatus identification information.

Here, the apparatus identification information may be a unique address of the local monitoring apparatus 200 in a network that transmits and receives data. For example, the apparatus identification information may be a media access control address (MAC) of a network card that is used in transmitting and receiving of data on a local area network (LAN).

Through the apparatus identification information, the local monitoring data management apparatus 100 may verify a local monitoring apparatus 200 from which the monitoring data is collected.

The identification unit 120 may identify the monitoring data collected from the collection unit 110 as one of structured monitoring data and unstructured monitoring data.

Here, the structured monitoring data may be data having a table structure or a tree structure in which a field is structured.

For example, structured data may be a relation database (RDB), comma-separated variables (CSV), an extensible markup language (XML), and a Java script object notation (JSON).

Here, unstructured data may be data, which is not structured such as an image, a picture, a document and the like, rather than data having a predetermined standard or format.

For example, unstructured data may be a graph, an image, audio information, and image information.

The identification unit 120 may use a flag of the monitoring data so as to identify the monitoring data as one of structured monitoring data and unstructured monitoring data.

That is, the identification unit 120 may identify whether the monitoring data, which is collected by verifying the flag of the monitoring data, is structured monitoring data or unstructured monitoring data.

The storage unit 130 may include a relational database 131 storing structured monitoring data, and an unstructured database 132 storing unstructured monitoring data.

The storage unit 130 may store the collected monitoring data in the relational database 131 or the unstructured database 132 on the basis of a monitoring data identification result of the identification unit 120.

More particularly, the storage unit 130 may store monitoring data identified as the structured monitoring data from the identification unit 120 in the relational database 131.

Also, the storage unit 130 may store monitoring data identified as the unstructured monitoring data from the identification unit 120 in the unstructured database 132.

The conversion unit 140 may convert the structured monitoring data stored in the relational database 131 into unstructured data.

More particularly, the conversion unit 140 searches structured monitoring data corresponding to a data conversion condition among the structured monitoring data stored in the relational database 131. Thereafter, the conversion unit 140 may perform an unstructured data conversion using the searched structured monitoring data.

Here, the data conversion condition may be whether a field value of the structured monitoring data is the same as a preset field value.

Referring to FIG. 3, structured monitoring data, which is electric power generation information, may be stored in the relational database 131. At this point, the electric power generation information may have field values including "regional information," "monitoring time information," and "monitoring date information."

For example, when the data conversion condition described above is whether data corresponding to "regional information" among the field values is "Seoul," the conversion unit 140 searches structured monitoring data corresponding to such a data conversion condition. Thereafter, the conversion unit 140 may perform an unstructured data conversion using only the searched structured monitoring data.

In particular, the conversion unit 140 may convert electric power generation information of photovoltaic power generation systems 300 located at Seoul into unstructured monitoring data representing a graph per date using the searched structured monitoring data.

Meanwhile, a conversion unit 140 according to another embodiment of the present disclosure may search structured monitoring data corresponding to a preset data format among the structured monitoring data stored in the relational database 131.

Here, the preset data format may be one among the RDB, the CSV, the XML, and the JSON.

Afterward, the conversion unit 140 according to another embodiment verifies the apparatus identification information that is combined with the structured monitoring data corresponding to the preset data format. At this point, the conversion unit 140 may convert the structured monitoring data, which is combined with apparatus identification information the same as the identified apparatus identification information, into unstructured monitoring data.

Through such an operation, the conversion unit 140 may convert only the structured monitoring data, which is collected from the same local monitoring apparatus 200, into the unstructured monitoring data.

The analysis unit 150 may analyze one of the structured monitoring data and the unstructured monitoring data respectively stored in the relational database 131 and the unstructured database 132 to produce analysis data with respect to the electric power generation information.

Here, the analysis unit 150 may perform a big data analysis from the unstructured monitoring data to produce the analysis data.

For example, the analysis unit 150 may perform a big data analysis on the unstructured monitoring data that represents a graph per date with respect to electric power generation information of the photovoltaic power generation systems 300 located at Seoul shown in FIG. 3.

As a result, the analysis unit 150 may produce estimated electric power generation information of the photovoltaic power generation systems 300 located at Seoul on the basis of the graph.

Although the present disclosure has been described with reference to the embodiments, it should be understood that numerous other substitutions, modifications and alterations can be devised by those skilled in the art without departing the technical spirit of this disclosure, and thus it should be construed that the present disclosure is not limited by the embodiments described above and the accompanying drawings.

What is claimed is:

1. A system comprising:
   a local monitoring data management apparatus;
   a communication network; and
   one or more monitoring apparatuses that use the communication network to transmit and receive monitoring data with respect to electric power generation information of a photovoltaic power generation cloud system,
   wherein the local monitoring data management apparatus:
      identifies the monitoring data as one of structured monitoring data and unstructured monitoring data using flag information of the monitoring data, wherein the unstructured monitoring data is selected from the group consisting of a graph, an image, and audio information, wherein the structured monitoring data has a table structure or a tree structure in which a field is structured;
      stores the monitoring data in a relational database on the basis of an identification result of the monitoring data, wherein the photovoltaic power generation cloud system communicates with the one or more local monitoring apparatuses to receive the monitoring data;
      converts the structured monitoring data into unstructured monitoring data using a data conversion condition comprising a preset field value among the field value of the structured monitoring data or searches the structured monitoring data corresponding to a preset data format among the structured monitoring data and converts the structured monitoring data, which is combined with apparatus identification information of the one or more monitoring apparatuses the same as the apparatus identification information among the searched structured monitoring data, into the unstructured monitoring data, wherein the local monitoring data management apparatus uses the data conversion condition if the field value of the structured monitoring data is the same as the preset field value, wherein the field value includes regional information, monitoring time information, and monitoring date information, and wherein the local monitoring data management apparatus verifies the apparatus identification information that is combined with the structured monitoring data corresponding to the preset data format; and performs a big data analysis from the unstructured monitoring data to produce estimated electric power generation information of the photovoltaic power generation cloud system located at different geographic regions on the basis of the graph and calculate an estimated price using the analyzed data.

2. The system of claim 1, wherein the local monitoring data management apparatus collects the monitoring data from the one or more monitoring apparatuses.

3. The system of claim 2, wherein the local monitoring data management apparatus collects the monitoring data by combining the apparatus identification information of the one or more monitoring apparatuses with the monitoring data.

\* \* \* \* \*